No. 647,145. Patented Apr. 10, 1900.
A. W. MEYER.
COOKING UTENSIL.
(Application filed June 13, 1899.)
(No Model.) 2 Sheets—Sheet 2.
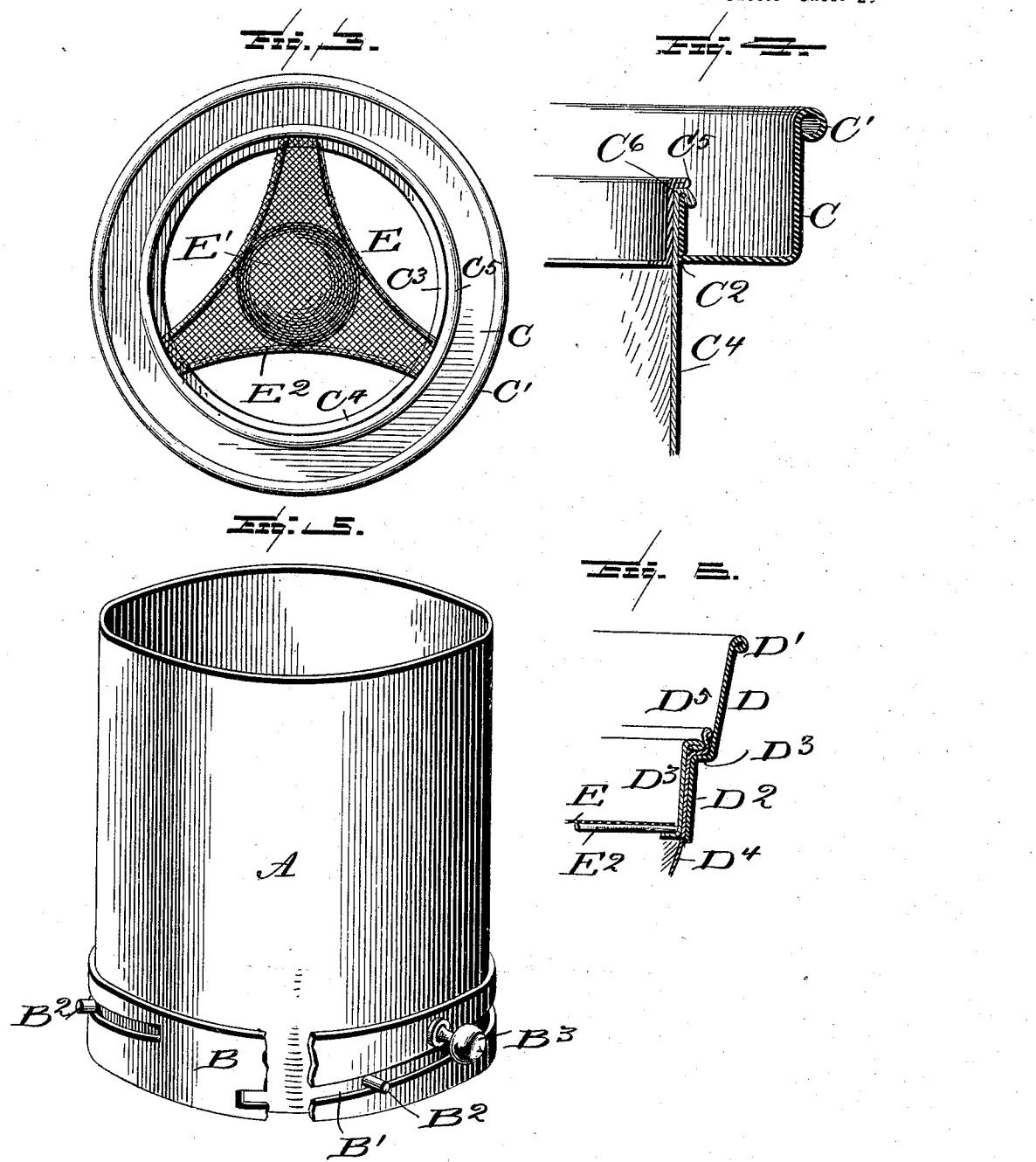

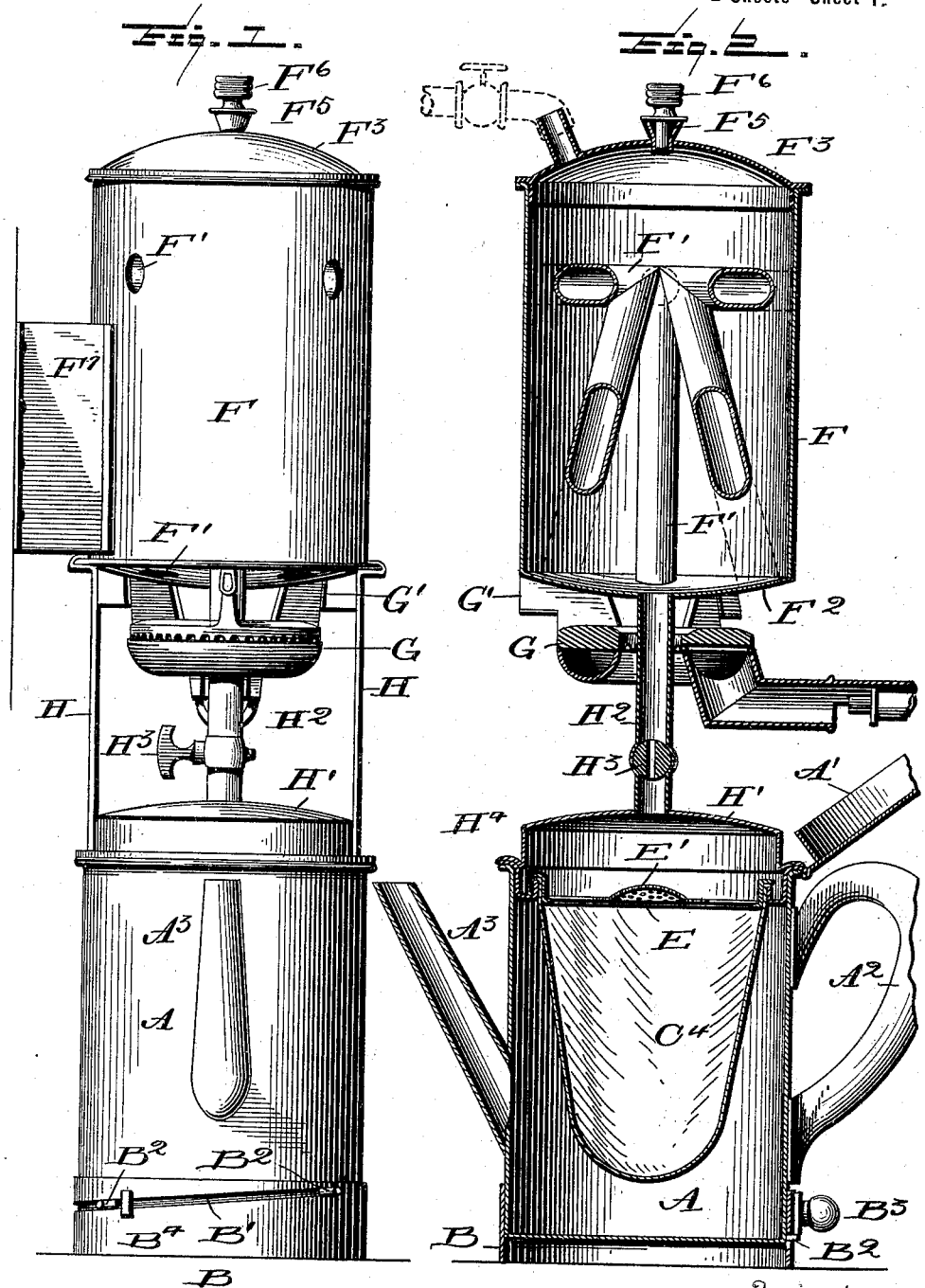

UNITED STATES PATENT OFFICE.

ALBERT W. MEYER, OF NEW YORK, N. Y.

COOKING UTENSIL.

SPECIFICATION forming part of Letters Patent No. 647,145, dated April 10, 1900.

Application filed June 13, 1899. Serial No. 720,389. (No model.)

*To all whom it may concern:*

Be it known that I, ALBERT W. MEYER, a citizen of the United States, residing at New York, in the county of New York, State of New York, have invented certain new and useful Improvements in Cooking Utensils, of which the following is a specification, reference being had therein to the accompanying drawings.

This invention relates to cooking utensils, and particularly to a structure of a pot or receptacle within which beverages may be prepared or other articles cooked and also to a construction of water-heater for use in connection with such cooking utensil.

The invention has for one object to improve the specific details of construction of the cooking vessel or pot in providing an improved specific form of strainer or bag for containing the material used in the receptacle.

A further object of the invention is to provide improved means for elevating the body of the vessel from the support upon which the bottom would normally rest.

The invention also has for an object the production of an improved heating device for coöperation with a cooking utensil within which water may be quickly and conveniently heated and introduced into the cooking utensil.

Other objects and advantages of the invention will hereinafter appear in the following description, and the novel features thereof will be particularly pointed out in the appended claims.

In the drawings, Figure 1 is an elevation of the water-heater and cooking vessel. Fig. 2 is a vertical section of the same. Fig. 3 is a plan of a bag or strainer holding ring. Fig. 4 is a sectional vertical detail of the same parts. Fig. 5 is a perspective of the lower portion of the cooking vessel, and Fig. 6 is a detail sectional view of a modified form of holding-ring.

Like letters of reference indicate like parts throughout the several figures of the drawings.

The letter A designates a cooking vessel, which may be of any desired configuration, but for the purpose of illustration is shown in the present case as the ordinary form of coffee or tea pot. This pot is provided with the usual lid A', handle $A^2$, and spout $A^3$. At the lower portion of the pot or vessel the same is surrounded by a lifting ring or band B, having therein a slot or way B', disposed at an angle or obliquely to the bottom of the vessel A. The vessel is also provided with pins $B^2$, traveling in this track or way B' and by means of which the bottom of the vessel A is elevated or raised above the bottom of the ring B in any desired manner—for instance, by holding the handle $A^2$ of the vessel in one position and then rotating the handle $B^3$, carried by the ring B. The extent of movement of the pins $B^2$ may be limited by any suitable form of stop $B^4$, as shown in Fig. 1. It will thus be obvious that the bottom of the vessel A can be raised above a stove or other support upon which the ring rests whenever desired or the body portion of the vessel lifted for a purpose to be hereinafter described.

To the upper portion of the vessel A a removable bag or strainer holder C is applied and is formed with a bead or overturned edge C', adapted to rest upon the top of the receptacle. This holder is also provided with a vertical clamping-face $C^2$, between which and a clamping-ring $C^3$ a strainer-bag $C^4$ is interposed. The clamping-ring $C^3$ is provided with a flange $C^5$, adapted to rest upon a shoulder $C^6$, formed at the upper portion of the vertical face $C^2$. The form of holder just described is illustrated in Figs. 2, 3, and 4; but I have also illustrated in Fig. 6 a slightly-modified construction, by which the best results are obtained. In this latter form the holder is composed of a ring D, with a beaded edge D' to rest upon the cooking vessel, and a vertical clamping-face $D^2$, between which and a clamping-ring $D^3$ a holding bag or strainer $D^4$ is interposed. This clamping-ring is provided with a flange $D^5$, adapted to coöperate with the seat or shoulder $D^6$, formed at the upper portion of the vertical clamping-face $D^2$. The clamping-rings $C^3$ and $D^3$ may be provided with a perforated shield or strainer E, adapted to break or separate a body of water falling upon the same, the central portion of this strainer being convex, as shown at E', and the edges thereof suitably supported by stiffening-wires $E^2$. It will be obvious that in both forms of this holding-ring the clamping-ring may be readily removed for the purpose of cleansing the bag or strainer for holding the article to be cooked, and when said ring is replaced an extended vertical bearing upon the bag is obtained and also the upper end of the bag clamped between the seat and coöperating flange at the upper portion of the clamping-ring. The holding-ring is also made removable, so that it can be introduced into any ordinary form or size of cooking utensil, and the provision of the inclined face, as shown in Fig. 6, permits the ring D to accommodate itself to slight differences in diameter of the vessel. Furthermore, the guard E serves to receive and break the body of liquid introduced into the receptacle, so that the same does not fall immediately upon the contents of the strainer or bag, but is sprayed thereon through the apertures or perforations of the reticulated guard.

For the purpose of heating and retaining in a heated condition a body of water or liquid for use in connection with any cooking utensil I have devised a structure of heater consisting of the receptacle F, provided with the interiorly-arranged heating-tubes F', which extend upwardly through the bottom $F^2$ of the heating-receptacle toward a central point and are then disposed laterally to the opposite side walls thereof. This produces the maximum of heating-surface and thoroughly utilizes all of the products of combustion from the burner G or other heating device which may be used. The heater G has been shown as an ordinary form of gas-burner supported below the receptacle F by means of hangers G' and by which burner a quick and convenient heating of the liquid is provided within the receptacle. The receptacle is provided with a cover $F^3$, having therein an inlet-nozzle $F^4$, adapted to be connected to a water-main or other suitable source of supply. The cover is also supplied with a vent-aperture $F^5$, which may be closed when desired by a plug $F^6$, frictionally held therein and adapted under ordinary conditions to serve as a handle for the cover $F^3$. The entire receptacle F may be supported from any suitable fixed part by means of a bracket $F^7$, as shown in Fig. 1, and depending from the bottom $F^2$ is a series of hangers H, carrying at their lower ends a cap H'. Between this cap and the lower portion of the receptacle F a connecting-pipe $H^2$ extends and is provided with a stop cock or valve $H^3$, by means of which the passage of liquid through said connecting-pipe may be permitted or stopped. The cap H' is further provided with an extended flange $H^4$, adapted to rest upon and make close contact with the upper edge of the cooking utensil.

In the operation of the device illustrated the water will be heated to a boiling-point within the receptacle F and retained therein until desired for use, at which time the cooking vessel will be supplied with the necessary article to be cooked and placed beneath the cap H'. The lifting-ring B is then rotated to elevate the vessel into firm contact with the cap $H^2$, and as the latter is carried by a fixed part a substantially steam-tight contact can be effected. At this time the valve or cock $H^3$ may be opened and the liquid from the receptacle permitted to pass into the cooking vessel. When the holding-ring is used with the guard E, the water falls upon the concave face of this guard and, passing through the perforations therein, is sprayed upon the material held within the bag or strainer $C^4$. It may further be stated that the lifting-ring is capable of application to any form of cooking utensil, and this invention is not confined to its application in connection with the heating-receptacle shown. The lifting-ring when applied to a cooking vessel will be used to elevate the bottom of the vessel above the heated surface and thus retain the articles therein in a heated condition or permit a slower cooking than would be effected if the bottom of the vessel rested upon the heated surface. This is particularly desirable in coffee-pots where it is desired to stop the boiling of the coffee after a certain time and retain the same in a heated condition ready for use. The particular structure of heating-receptacle permits the very quick and ready heating of liquid for use in cooking, so that in making fresh coffee or tea the necessary water may be drawn in any desired quantities for immediate use and the beverage prepared within a very few minutes.

It is obvious that changes may be made in the construction and configuration of the several parts of the device without departing from the spirit of the invention as defined by the appended claims.

Having described my invention, what I claim as new, and desire to secure by Letters Patent, is—

1. In a cooking utensil, a heating-receptacle, heating-tubes within the same extending upwardly from the edges of the bottom toward a central point and thence radially to the sides of the receptacle, a heating device beneath said receptacle, and means below said heating device for connecting said receptacle with a cooking vessel; substantially as specified.

2. In a cooking utensil, a heating-receptacle, heating-tubes within the same extending upwardly from the edges of the bottom toward a central point and thence radially to the sides of the receptacle, a heating device beneath said receptacle, a valved discharge-pipe from said receptacle, and a cap beneath said heating device communicating with said pipe for resting upon a cooking vessel; substantially as specified.

3. In a cooking utensil, the combination with a fixed liquid-heating receptacle provided with a connecting-cap, of a removable cooking vessel adapted to be placed beneath said cap, and a diagonally-slotted lifting-ring engaging a projection from the vessel for elevating and holding said vessel in contact with said cap; substantially as specified.

4. In a cooking utensil, a heating-receptacle, heating-tubes within the same extending upwardly from the bottom toward a central point and thence radially to the sides of the receptacle, a heating device beneath said receptacle, means for connecting said receptacle with a cooking vessel, a valved discharge-pipe from said receptacle, a cap for resting upon a cooking vessel, a removable cooking vessel beneath said cap and provided with projecting lugs at its lower portion, and a lifting-ring having obliquely-disposed slots cooperating with said lugs to elevate the vessel; substantially as specified.

5. In a cooking utensil, the combination of a heating-receptacle, a valved discharge-pipe from the same, a flanged cap at the lower end of said pipe, a heating device beneath said receptacle, a reticulated guard within said vessel and beneath said discharge-pipe, and a diagonally-slotted lifting-ring engaging a projection from the vessel for elevating said vessel into contact with said cap; substantially as specified.

In testimony whereof I affix my signature in presence of two witnesses.

ALBERT W. MEYER.

Witnesses:
JOHN C. RIGGIN,
C. W. BOWERS.